US011668054B2

(12) United States Patent
Helmick

(10) Patent No.: US 11,668,054 B2
(45) Date of Patent: Jun. 6, 2023

(54) RAILROAD TIE PLATE APPARATUS AND METHOD

(71) Applicant: Herzog Railroad Services, Inc., St. Joseph, MO (US)

(72) Inventor: Stoney L. Helmick, Cox's Mills, WV (US)

(73) Assignee: Herzog Railroad Services, Inc.

( * ) Notice: Subject to any disclaimer, the term of this patent is extended or adjusted under 35 U.S.C. 154(b) by 535 days.

(21) Appl. No.: 16/806,836

(22) Filed: Mar. 2, 2020

(65) Prior Publication Data

US 2021/0269986 A1     Sep. 2, 2021

(51) Int. Cl.
    *E01B 29/32*     (2006.01)
(52) U.S. Cl.
    CPC .................................. *E01B 29/32* (2013.01)
(58) Field of Classification Search
    CPC ......... E01B 29/24; E01B 29/32; B65G 27/04; B65G 27/10; B65G 47/24; B65G 47/248
    See application file for complete search history.

(56) References Cited

U.S. PATENT DOCUMENTS

| | | | |
|---|---|---|---|
| 8,132,512 B2 | 3/2012 | Helmick | |
| 8,528,484 B2 | 9/2013 | Helmick | |
| 9,016,208 B2 | 4/2015 | Coots | |
| 9,038,542 B2 | 5/2015 | Coots | |
| 9,156,623 B1 * | 10/2015 | Buzdum | ................. E01B 29/32 |
| 9,745,132 B2 | 8/2017 | Coots | |
| 9,745,150 B2 | 8/2017 | Coots | |
| 9,752,286 B2 | 9/2017 | Coots | |
| 10,112,215 B1 | 10/2018 | Coots | |
| 10,427,876 B2 | 10/2019 | Coots | |
| 2011/0100248 A1 | 5/2011 | Buckley et al. | |

* cited by examiner

*Primary Examiner* — Robert J McCarry, Jr.
(74) *Attorney, Agent, or Firm* — Avek IP, LLC; Kent R. Erickson

(57) ABSTRACT

An apparatus for distributing tie plates alongside rails of a railroad track including a singulating system for separating and singulating tie plates to be distributed along the rails of a railroad track, an orientation system positioned beneath the singulating system for orienting the tie plates with the correct side up, and a distribution system for distributing tie plates along the rails of a railroad track.

7 Claims, 12 Drawing Sheets

RAILROAD TIE PLATE APPARATUS AND METHOD

FIELD OF INVENTION

The present application relates to railroad tracks, and more particularly to an apparatus and method for distributing railroad tie plates adjacent to the rails of railroad tracks.

BACKGROUND

The rails of a railroad track are usually secured to cross ties by spikes driven into tie plates, with the tie plates located between the rail and the tie, and the head of the spike overlapping the bottom of the rail. The tie plates block lateral movement of the rails. Anchors are attached to the rail on either side of the tie to secure the rail against longitudinal movement.

Railroad ties occasionally must be replaced due to wear. After a tie is replaced, tie plates must be provided between the rail and the tie so that the rail may be properly secured to the tie.

Several references propose various systems for use in replacing tie plates. For example, U.S. Pat. No. 4,280,613, issued to J. K. Stewart on Jul. 28, 1981, describes a tie plate conveying and orienting system.

U.S. Pat. No. 4,770,103, issued to F. Allmer on Sep. 13, 1988, describes a rail clamp. The rail clamp includes a pair of line-up wheels for engaging the inside edges of the rails. A pair of pivoting clamping arms, with each clamping arm having a disk rotatably mounted to its end, engages the outside edge of each rail, just below the rail's ball. Movement of the clamping arms is controlled by hydraulic cylinders. Additionally, a stabilizer cylinder connecting a bridge crossing the chassis to the rail lifting assembly may either permit the rail lifting assembly to float to correspond with the rails, or may be locked in position.

U.S. Pat. No. 4,733,614, issued to G. Mohr et al. on Mar. 29, 1988, describes a machine for repairing a railway track. The machine includes a main chassis having various devices for repairing a railway, mounted on a chain drive under a railway vehicle. A counter weight mounted to the chain drive, moving the opposite direction, counters the effects of inertia.

U.S. Pat. No. 4,942,822, issued to D. J. Cotic on Jul. 24, 1990, describes an apparatus and method for automatically setting rail tie plates. The apparatus includes a frame having a ramp thereon. The ramp stores the tie plates, and includes a control mechanism for releasing them one at a time into a plate pocket. A reciprocated pusher then moves the plate from the plate pocket to its position on the tie.

U.S. Pat. No. 5,067,412, issued to J. Theurer et al. on Nov. 26, 1991, describes a tie plate-inserting machine. The front of the machine includes a crane broom with a tie plate-collecting magnet. A funnel adjacent to the crane leads to a conveyer, which terminates above a sorting table. A roller conveyer conveys ties from the sorter to a magazine. The magazine moves between a level position for receiving tie plates from the sorting table, and a lower position for dispensing the tie. The machine includes a tie plate-inserting arm slidably supported by a guide rod, for pushing the-tie plates from the magazine to their position below the rail. A lifting roller pivots between a raised position and a lowered position for permitting tie plates to be pushed thereon from the magazine to their final position below the rail.

U.S. Pat. No. 5,193,461, issued to J. Theurer et al. on Mar. 16, 1993, describes a tie exchange means for both removing ties and inserting new ties. The tie exchange machine may move longitudinally along a guide track. A scarifier and track-lifting device are included. A mobile tie transporting crane may move towards or away from the tie exchange device, for transporting either new ties to be installed or old ties which have been removed. The tie-depositing device is a vertically adjustable forklift.

U.S. Pat. No. 5,305,692, issued to H. Madison et al. on Apr. 26, 1994, and assigned to Harsco Corporation, describes a tie exchanger mounted on a truck. The tie exchanger has a rail clamp table having rail clamps and a boom. The boom includes a tie clamp, and may pivot around the vertical axis to insert ties from either side of the tracks.

U.S. Pat. No. 5,331,899, issued to J. D. Holley on Jul. 26, 1994, describes a tie plate installer and remover using a magnetic wheel to insert or remove a tie plate. The tie plate installer includes a tie magazine from which tie plates are dropped into a shoot leading to the magnetic wheel, which then carries the tie plate to a position on the tie adjacent to its final location under the rail, and finally pushes it under the rail.

U.S. Pat. No. 5,419,259, issued to J. Theurer et al. on May 30, 1995, describes a ballast stabilizer. The ballast stabilizer has a rail clamp including a roller for engaging the rail's ball, mounted on an arm secured at its other end to a lever. The opposite arm of the lever is secured to a hydraulic cylinder, so that extending the cylinder pushes inward on the clamp arm. A pair of vertical inner wheels are pushed against the gauge side of the rail's ball by hydraulic cylinders. A shaking apparatus vibrates the machine parallel to the ties.

U.S. Pat. No. 5,722,325, issued to K. E. Glomski et al. on Mar. 3, 1998, describes a tie replacement apparatus including drip elements for holding a tie plate in place while the tie underneath is replaced.

U.S. Pat. No. 5,839,377, issued to D. M. Brenny et al. on Nov. 24, 1998, describes a machine for installing and removing elastic rail clips of the type used for fastening rails to concrete or wooden ties.

U.S. Pat. No. 6,170,401, issued to R. Miller et al. on Jan. 9, 2001, describes a rail vehicle for collection and distribution of railroad cross ties.

When replacing tie plates, it is useful to position the tie plates near the section of track where the plates will be used to secure the rail to the ties. More specifically, it would be helpful to be able to automatically or semi-automatically place a tie plate at the respective ends of a railroad tie to which a section of rail is going to be attached. Furthermore, it is desirable to be able to easily manipulate and move an apparatus which could automate the tie-placement system and to tie such an apparatus into an existing hi-rail truck or other rail-vehicle system. Accordingly, a railway tie placement apparatus and method incorporating these features is desired.

SUMMARY

The present application solves the foregoing problems by providing an apparatus and method for automatically depositing railroad tie plates adjacent one or both rails of a railroad track. The application teaches an apparatus adapted for use with a hi-rail truck and having a singulating system for separating and ordering tie plates, an orientation system for orienting the tie plates with the correct side facing up, and a distribution system for delivering the tie plates outside one or both rails of the railroad track.

In an alternative embodiment, the application teaches a singulating system having an infeed chute positioned beneath the pre-load staging hopper and conveyor belt for receiving the tie plates; an incline conveyor having a lower end and an upper end, wherein the lower end of the incline conveyor is positioned beneath the infeed chute; a bi-directional flat belt positioned at the upper end of the incline conveyor; a transfer chute positioned at a first end of the bi-directional flat belt for receiving a tie plate for orienting and distribution, and a conveyor belt at a second end of the bi-directional flat belt for recycling a tie plate back to the infeed chute.

In another alternative embodiment, the application teaches an orientation system positioned beneath the transfer chute at the second end of the bi-directional flat belt, the orientation system comprising a scan conveyor belt, a scanner for detecting the orientation of a tie plate on the scan conveyor as the tie plate passes beneath the scanner, a processor in communication with the scanner for determining which direction a scanned tie plate needs to be rotated and whether the scanned tie plate needs to be flipped, and a flipping mechanism positioned at the end of the scan conveyor.

In yet another alternative embodiment, the application teaches a distribution system for distributing tie plates along the rails of a railroad track, the distribution system comprising an infeed belt positioned adjacent the end of the scan conveyor and beneath the flipping mechanism; a gate between the scan conveyor and the infeed belt for aligning the tie plates as the tie plates move onto the infeed belt; a skate conveyor positioned adjacent the infeed belt; a lower belt feeder for aggregating tie plates to be distributed; and outfeed belts for depositing tie plates to the left or right of the rails of a railroad track.

BRIEF DESCRIPTION OF THE DRAWINGS

The present invention is described with reference to the accompanying drawings. In the drawings, like reference numbers indicate identical or functionally similar elements. The left-most digit(s) of a reference number identifies the drawing in which the reference number first appears.

DETAILED DESCRIPTION

Figure 1:
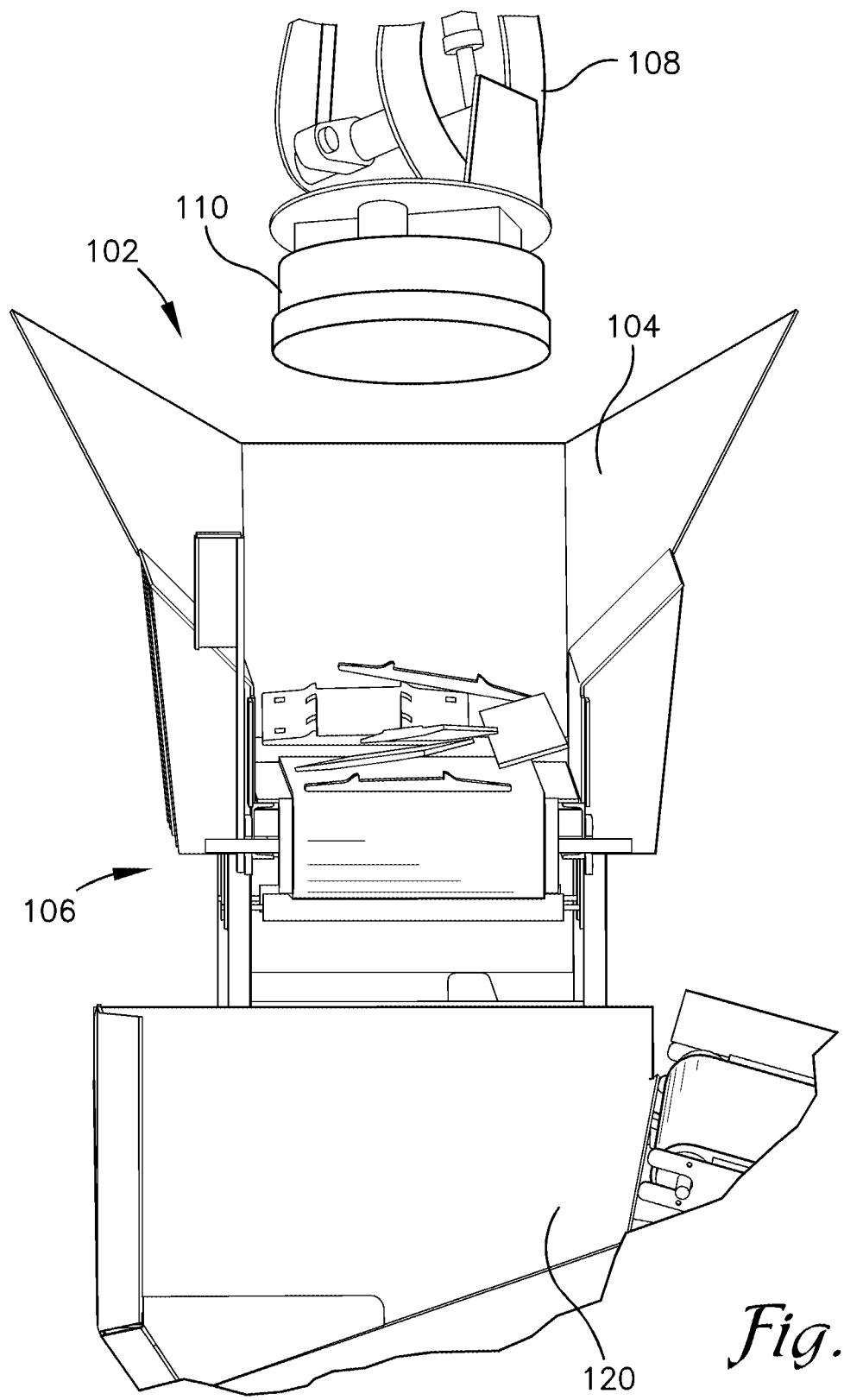
FIG. 1 is a perspective view of a pre-load staging hopper and conveyor belt.

According to the present application, an apparatus is described which provides an automatic or semi-automatic conveyor belt system for placing railroad tie plates adjacent the parallel rails of a length of railroad track.

According to at least one aspect of the invention, the apparatus includes a pre-load staging hopper and conveyor belt; a singulating system for separating and singulating tie plates to be distributed along the rails of a railroad track, the singulating system comprising an infeed chute positioned beneath the pre-load staging hopper and conveyor belt for receiving the tie plates; an incline conveyor having a lower end and an upper end, wherein the lower end of the incline conveyor is positioned beneath the infeed chute; a bi-directional flat belt positioned at the upper end of the incline conveyor; a transfer chute positioned at a first end of the bi-directional flat belt for receiving a tie plate for orienting and distribution, and a conveyor belt at a second end of the bi-directional flat belt for recycling a tie plate back to the infeed chute; and an orientation system positioned beneath the transfer chute at the second end of the bi-directional flat belt, the orientation system comprising a scan conveyor belt, a scanner for detecting the orientation of a tie plate on the scan conveyor as the tie plate passes beneath the scanner, a processor in communication with the scanner for determining which direction a scanned tie plate needs to be rotated and whether the scanned tie plate needs to be flipped, and a flipping mechanism positioned at the end of the scan conveyor; and a distribution system for distributing tie plates along the rails of a railroad track, the distribution system comprising an infeed belt positioned adjacent the end of the scan conveyor and beneath the flipping mechanism; a gate between the scan conveyor and the infeed belt for aligning the tie plates as the tie plates move onto the infeed belt; a skate conveyor positioned adjacent the infeed belt; a lower belt feeder for aggregating tie plates to be distributed; and outfeed belts for depositing tie plates to the left or right of the rails of a railroad track.

A second aspect of the invention is an apparatus for distributing tie plates alongside rails of a railroad track, including a singulating system for separating and singulating tie plates to be distributed along the rails of a railroad track; an orientation system for orienting tie plates after the ties plates pass through the singulating system, wherein the orientation system is positioned beneath a transfer chute between the singulating system and the orientation system; and a distribution system for distributing the oriented tie plates exiting the orientation system along the rails of a railroad track, the distribution system comprising outfeed belts for depositing tie plates to the left or right of the rails of a railroad track.

A third aspect of the invention is a method of placing railroad tie plates alongside rails of a railroad track including feeding railroad tie plates into a tie plate distribution system comprising (i) a singulating system for separating and singulating tie plates to be distributed along the rails of a railroad track; an orientation system for orienting tie plates after the ties plates pass through the singulating system, wherein the orientation system is positioned beneath a transfer chute between the singulating system and the orientation system; and a distribution system for distributing the oriented tie plates exiting the orientation system along the rails of a railroad track, the distribution system comprising outfeed belts for depositing tie plates to the left or right of the rails of a railroad track.

An application of the apparatus and system can involve integration with a hi-rail truck or other similar rail vehicle adapted to feed railroad tie plates to the apparatus for automatic or semi-automatic placement of the tie plates alongside a length of railroad track and more specifically outside the respective parallel rails of the track and adjacent the ends of the railroad ties.

As shown most clearly in FIG. 1, the apparatus for distributing tie plates alongside rails of a railroad tracks optionally but preferably includes a pre-load staging area 102 comprising a hopper 104 and a conveyor 106. The pre-load staging area 102 can hold at least one hundred fifty 14" tie plates and one hundred 18" tie plates. The pre-load staging area 102 can be loaded using a boom 108 with a magnet 110, and the conveyor 106 can be manually jogged by an operator in a crow's nest to trickle tie plates onto a chute 120 and into the system for singulation, orientation, and distribution.

Singulation

Figure 2:
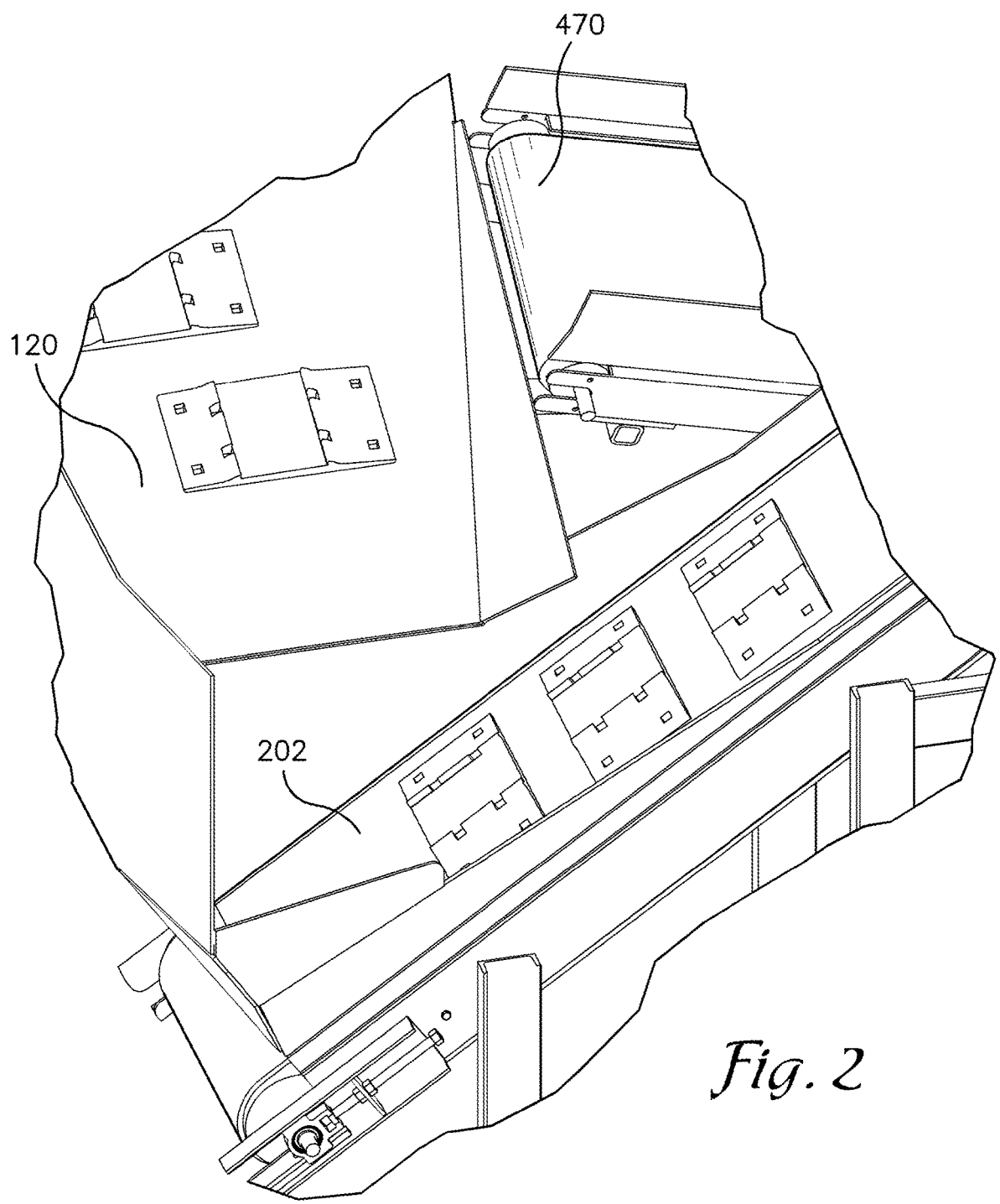
FIG. 2 is a perspective view of railroad tie plates on an incline conveyor.
Figure 3:
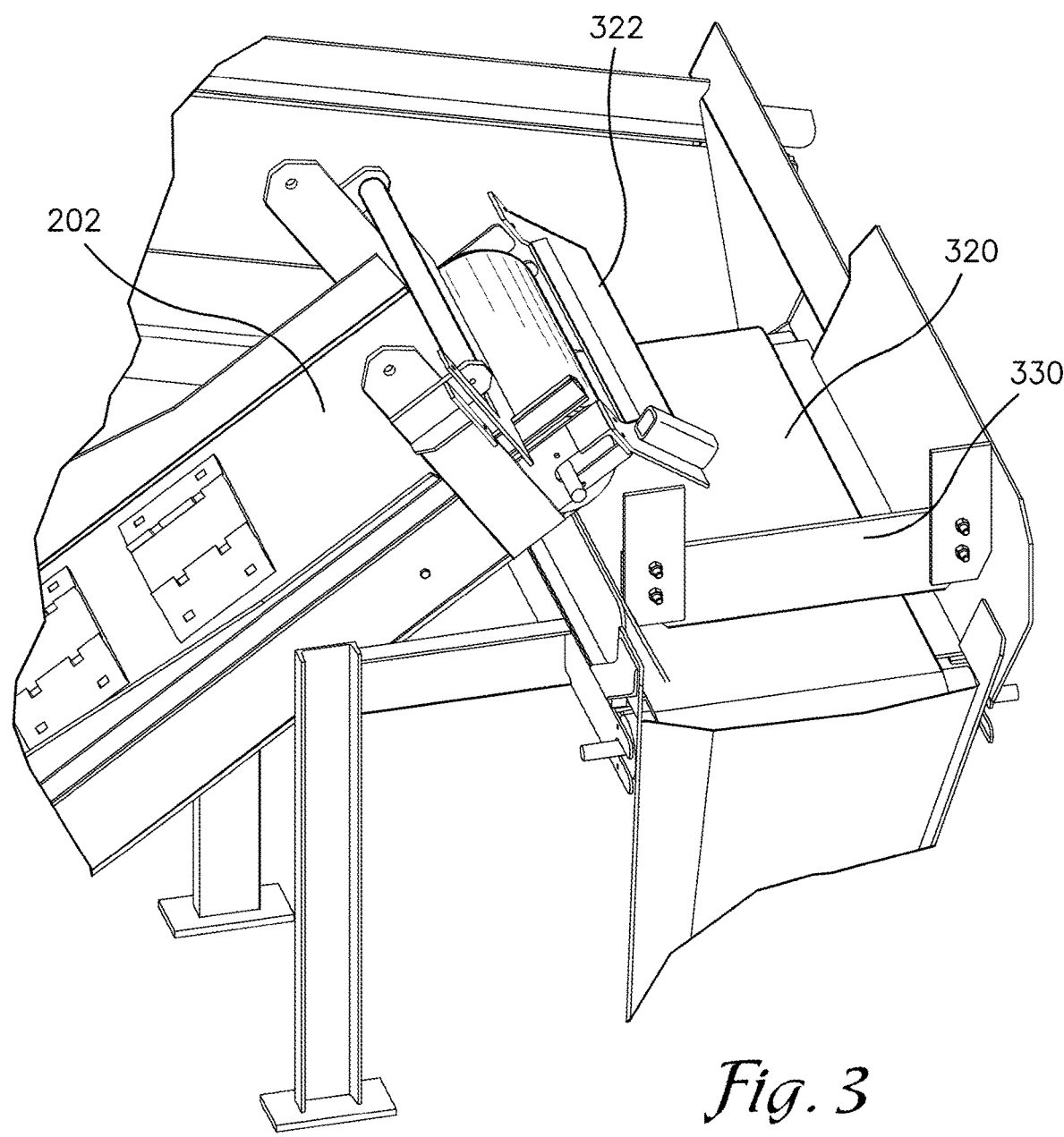
FIG. 3 is a perspective view of tie plates exiting an incline conveyor.
Figure 4:
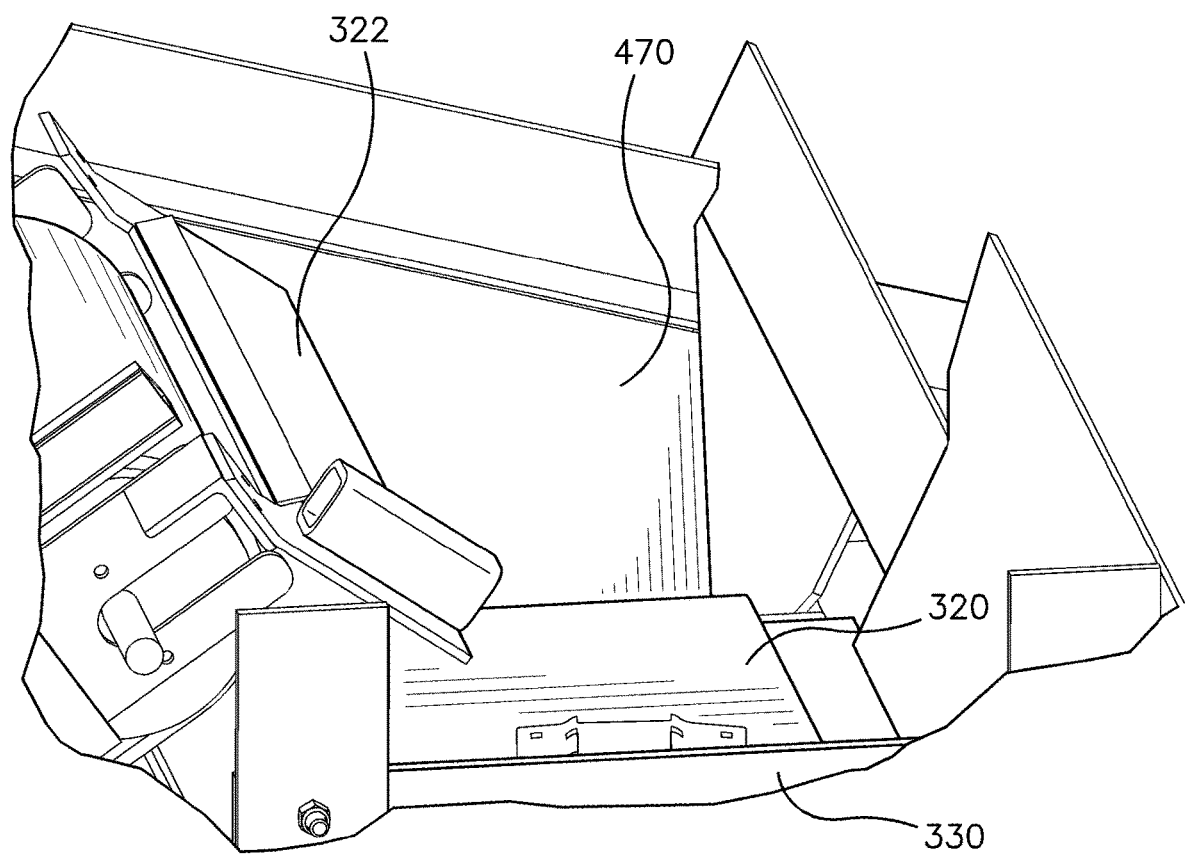
FIG. 4 is a top perspective view of a bi-directional flat belt.
Figure 5:
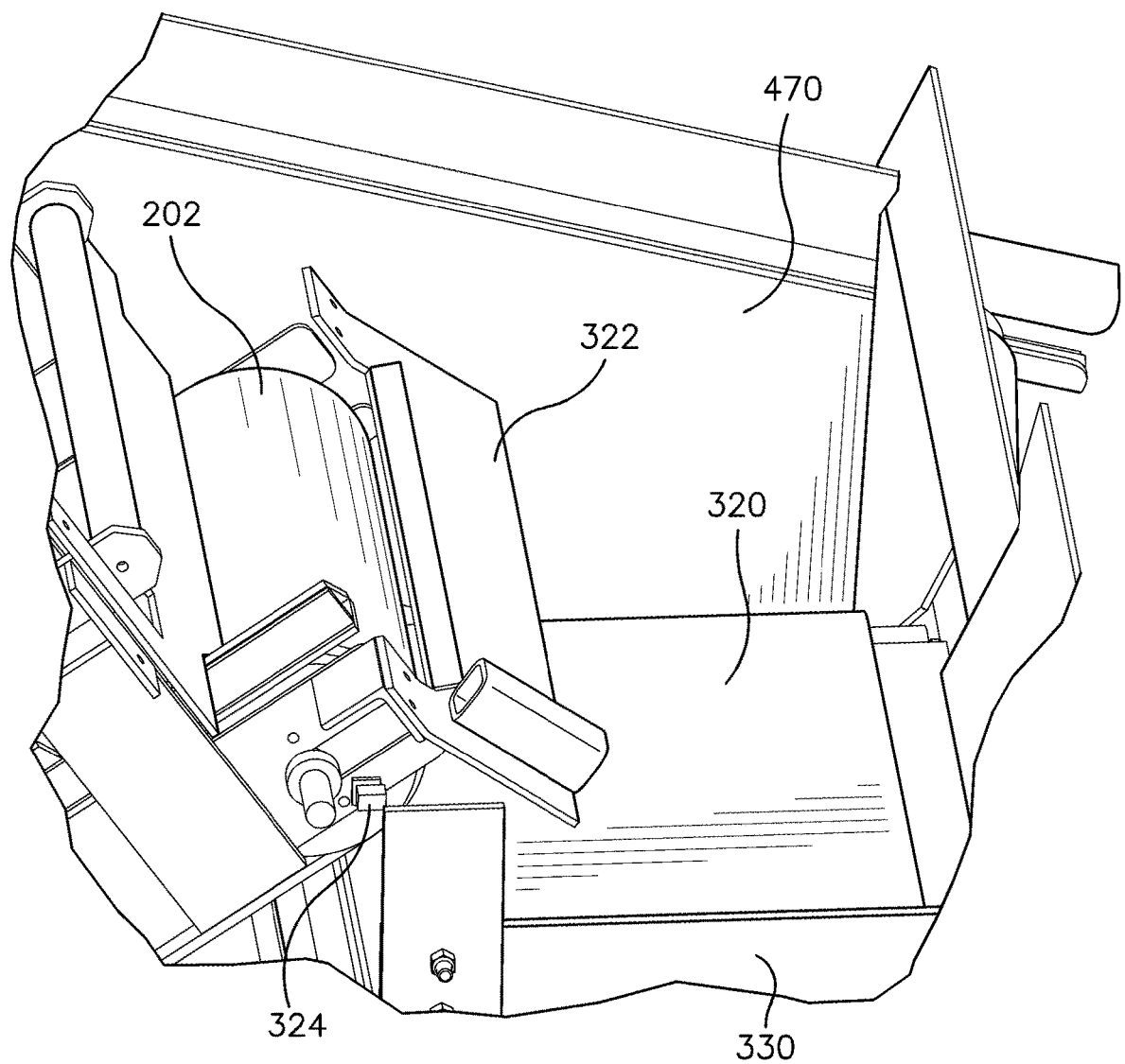
FIG. 5 is a top perspective view of a laser at the head of the bi-directional flat belt.
Figure 6:
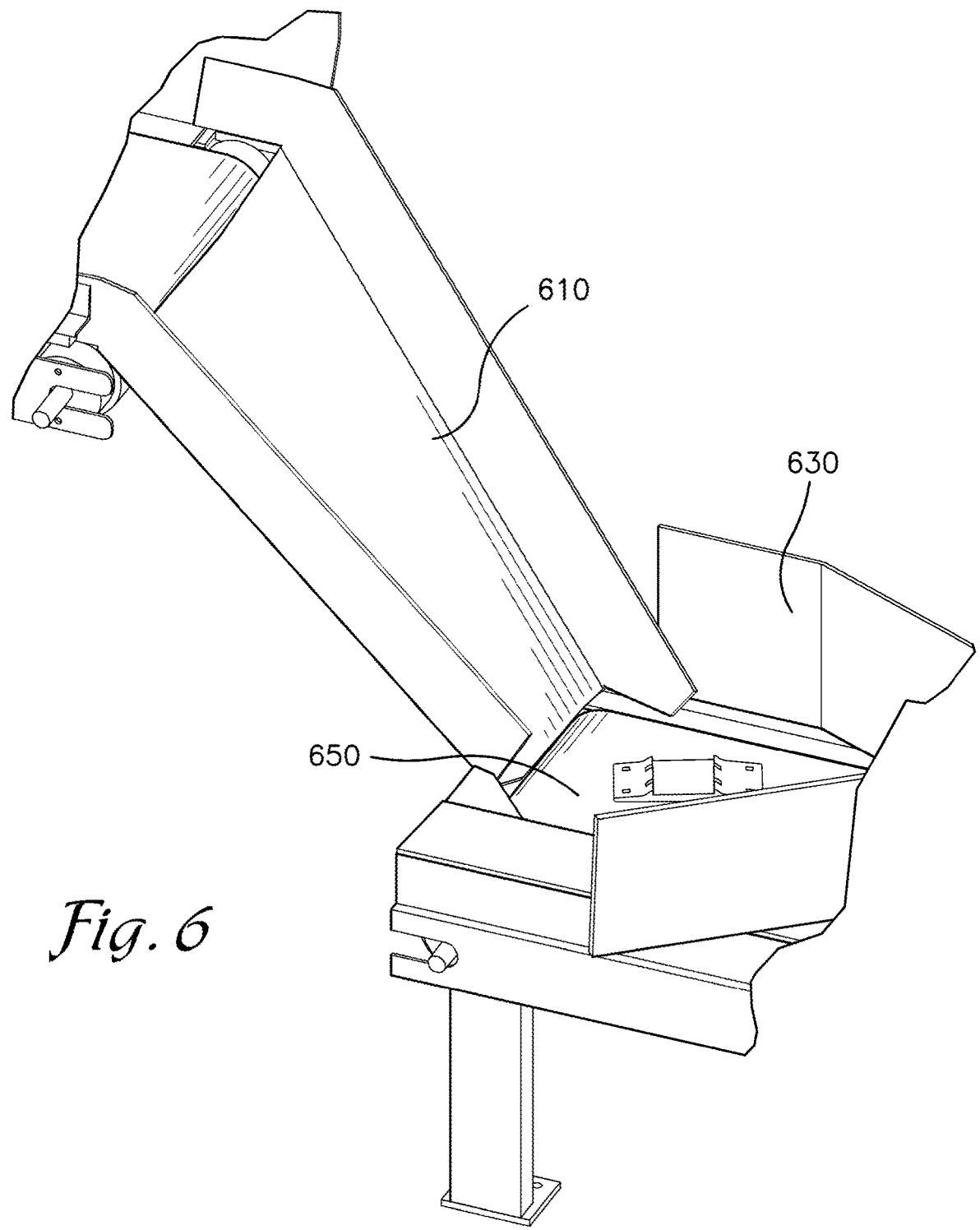
FIG. 6 is a side perspective view of a transfer chute leading to an orientation system.
Figure 7:
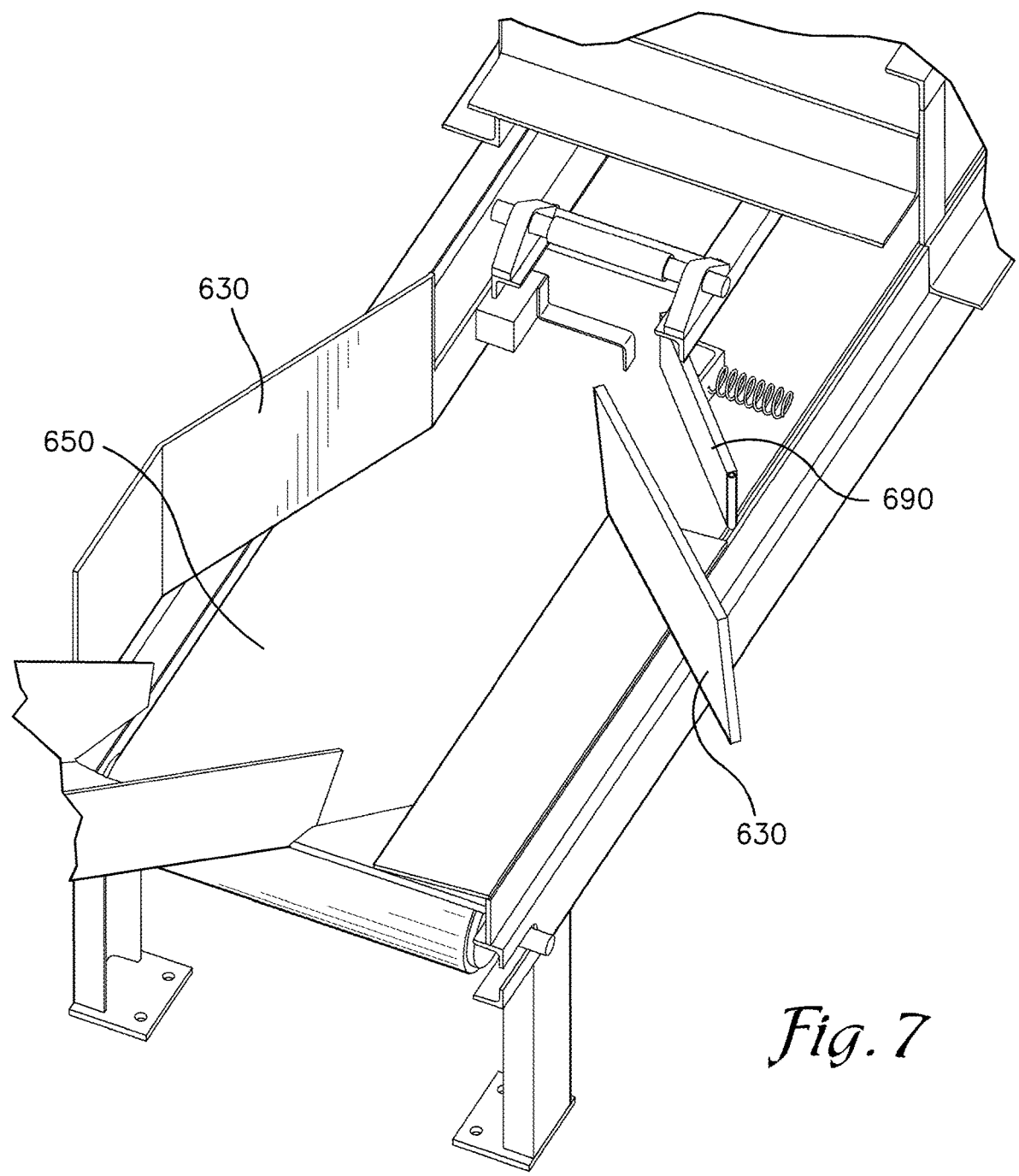
FIG. 7 is a top perspective view of a scan conveyor belt.
Figure 8:
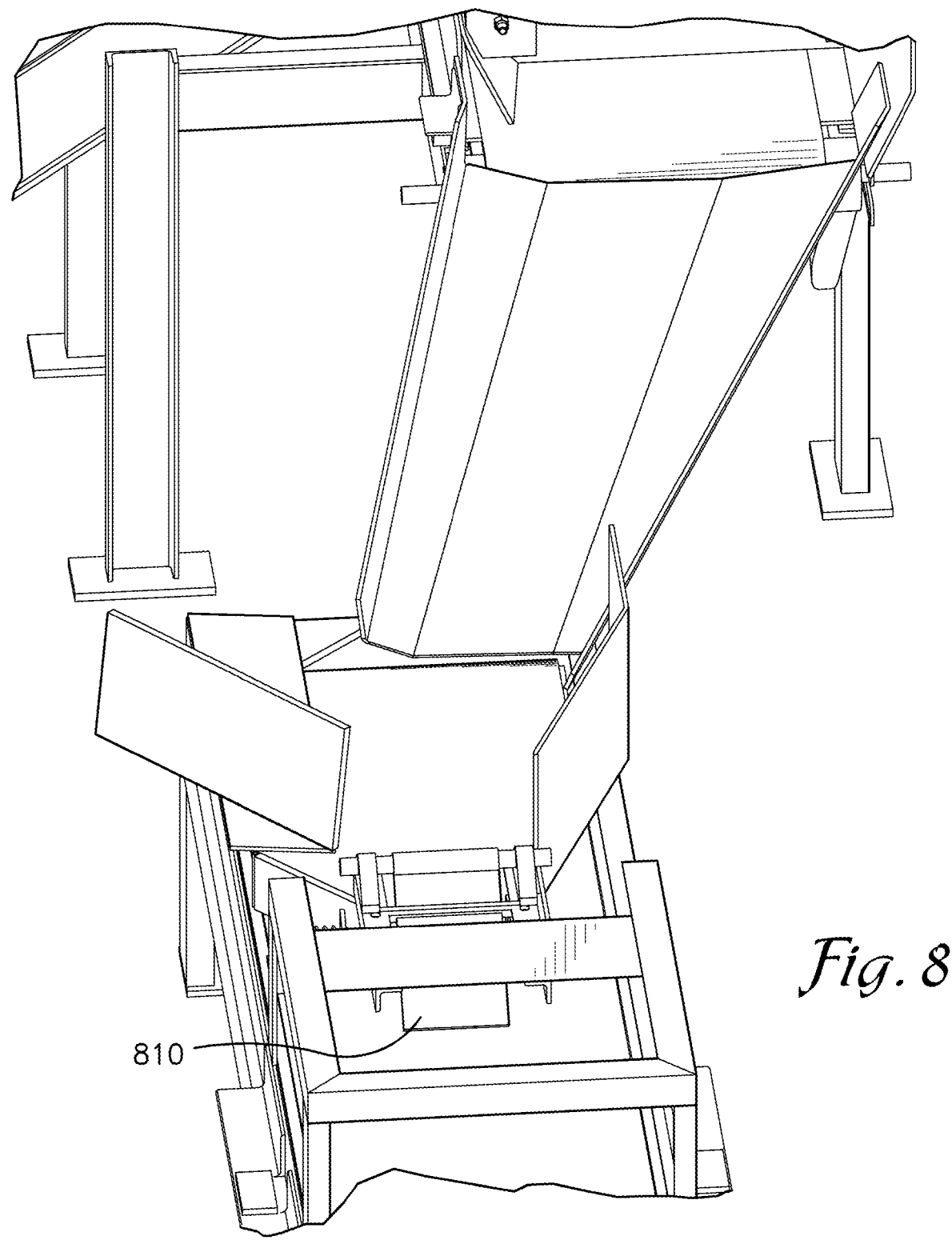
FIG. 8 is a front perspective view of a scanner positioned above the scan conveyor belt.
Figure 9:
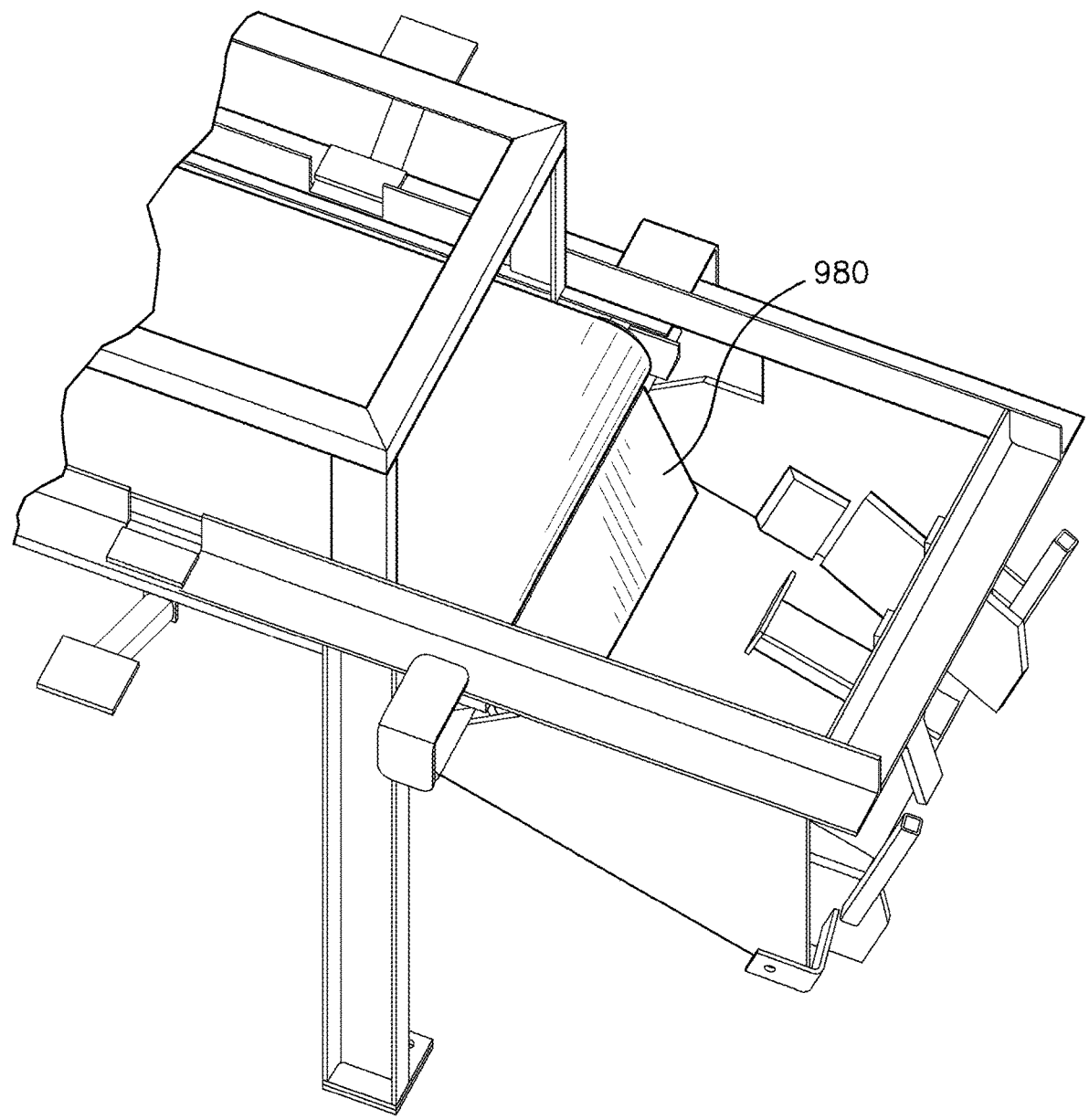
FIG. 9 is a side perspective view of a flipping mechanism positioned at the end of the scan conveyor belt.
Figure 10:
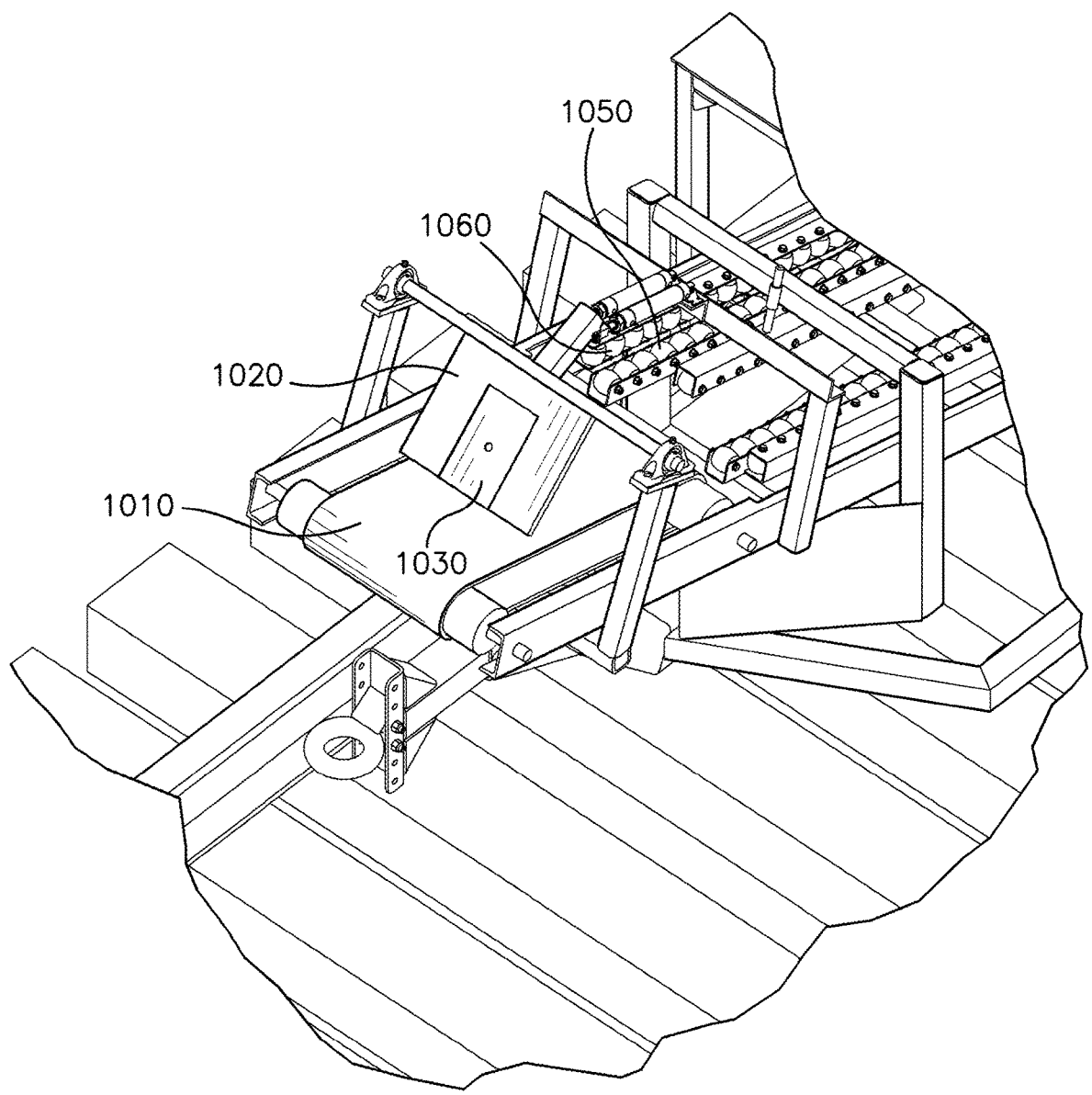
FIG. 10 is a top perspective view of the infeed belt of the plate distribution system.
Figure 11:
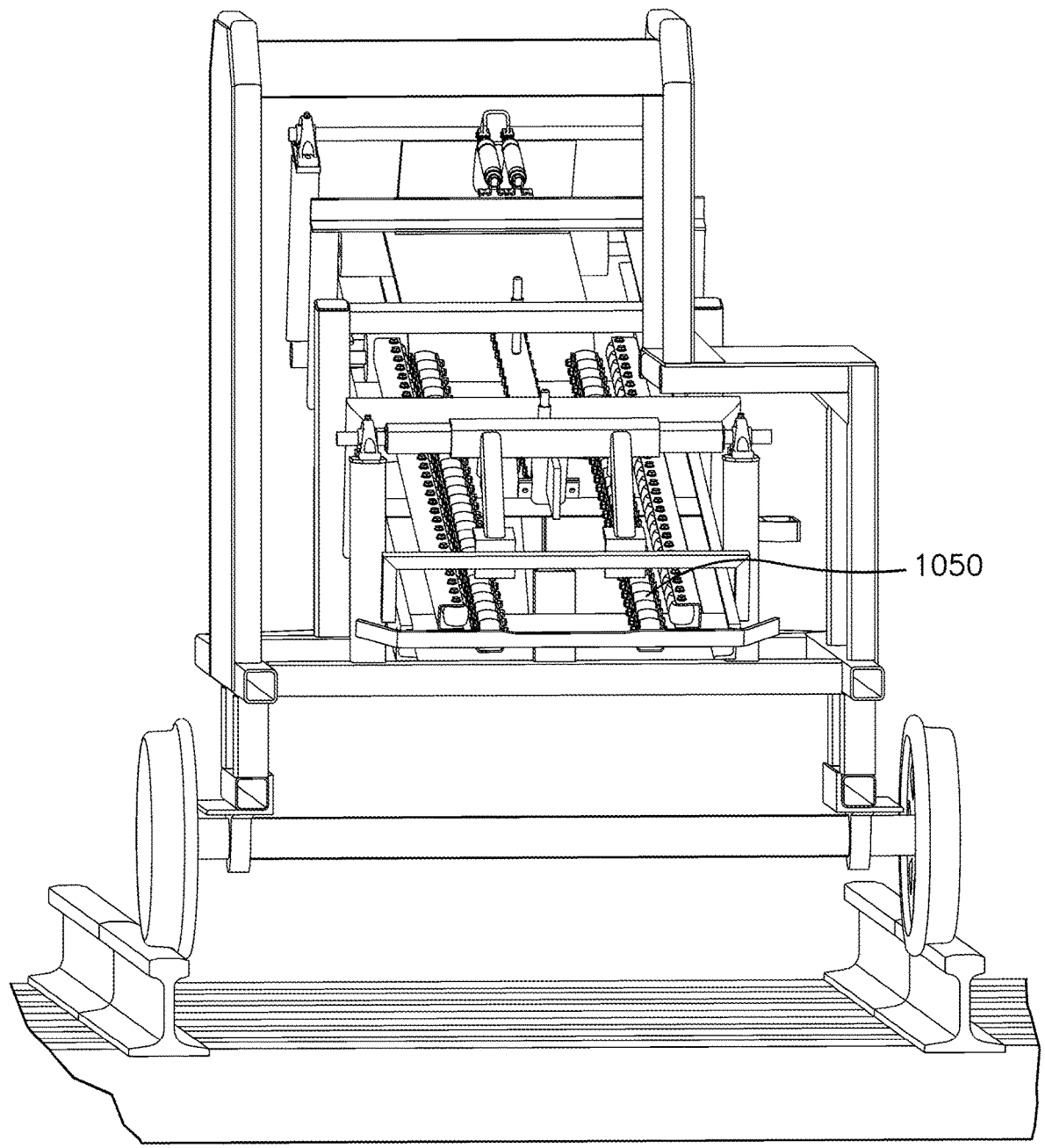
FIG. 11 is a front perspective view of a skate conveyor.
Figure 12:
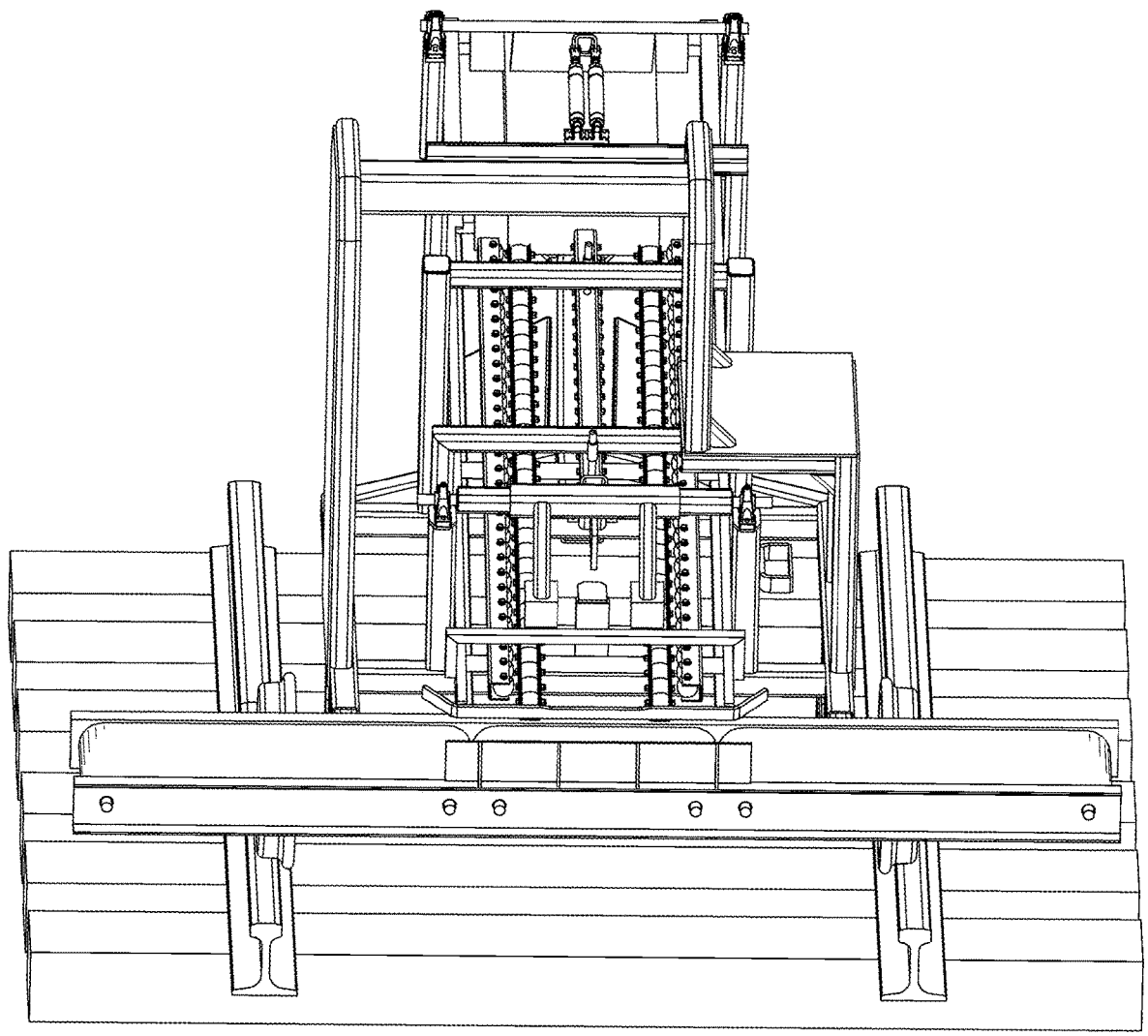
FIG. 12 is a front perspective view of the distribution system relative to the railroad rails.

Referring to FIG. 2, the tie plates are dropped onto an incline conveyor 202, which optionally but preferably is a magnetic bottom conveyor. A magnet extends the entire length of the incline conveyor 202 and can be adjusted up and down relative to the incline conveyor 202. The plates are further singulated on the incline conveyor 202 before being dropped onto a bi-directional flat belt 320, as shown in FIG. 3. At the top of the incline conveyor 202 there is a hinged gate 322 that can include a prox sensor to sense the presence of a plate. The gate 322 remains closed until the previous plate dropped onto the bi-directional belt 320 is out of the way, thereby preventing a second plate from being dropped onto the one recently dropped onto the bi-directional belt 320. The gate 322 can be operated with a prox switch in communication with a computer. When the hinged gate 322 is open it allows the incline conveyor 202 to start and to drop one to two plates at a time onto the bi-directional flat belt 320. The bi-directional flat belt 320 optionally but preferably includes a laser 324 at the head of the bi-directional flat belt 320 that stops tie plates to prevent more than one tie plate from going into the orientation system. When more than 1 to 2 plates are dropped into the orientation system, the additional plates are recycled by the operator who reverses the bi-directional flat belt 320 to transmit the tie plates back into the incline hopper to be singulated. The recycle belt can run continuously. The laser 324 will stop the belt until the previous plate passes a limit switch leading on the scan conveyor. The plates optionally but preferably are spaced about 1.5 seconds apart.

A flat bar 330 is positioned above the bi-directional flat belt 320 to help disentangle and to singulate the plates. If two or more plates get stuck together, the operator can jog and/or reverse the bi-directional flat belt 320 such the tangled tie plates come into contact with the flat bar 330 to knock them loose. When the operator reverses the bi-directional flat belt 320, the plates are dropped onto an incline belt 470 that recycles the plates back through the chute 120 and onto the incline conveyor 202. A steel roller and a gap can be positioned between the bi-directional belt 320 and the chute leading onto the scan conveyor to allowed debris from the plates to escape and to prevent debris from passing to the scan conveyor.

Orientation

As the plates travel off the bi-directional flat belt 320 for orientation, the plates pass through a chute 610 onto a scan conveyor belt 650. At the beginning of the scan conveyor belt 650, the plates are directed by inwardly projecting metal rails 630 to the center of the scan conveyor belt 650 for proper scanning by a measurement flap 810. The metal rails 630 center and straighten the plates so they are positioned lengthwise on the scan conveyor 650. A limit switch detects the presence of a plate and signals back to the bi-directional belt 320 to allow the release of another plate. A flap with a spring 690 also can be positioned along a side of the scan conveyor 650 to help center the plates on the scan conveyor 650.

The measurement flap 810 is attached to an encoder, which gives an analog signal to a computer to determine the orientation of the plate. Once the plate is scanned, the computer decides whether to turn and/or to flip plate. A flipping mechanism 980 is positioned at the end of the scan conveyor 650. If the plate is right side up, the flipping mechanism 980 stays up and the plate is not flipped. When the flipper 980 is retracted, the plate is flipped to a right side up orientation. The flipper 980 and encoder controls are controlled with a pneumatic cylinder underneath the flipper. A pneumatic cylinder also can be used to shove a bar forward from the side of the scan conveyor 650 to rotate a plate. The cylinder shoves an actuator in and out, and the force of the belt will spin a plate after the plate hits one or more extending metal protrusions. Above the exit of the scan conveyor is a downward projection section of flat steel with a hinge and spring to keep tie plates from bouncing too high and being re-adjusted.

Distribution

Once the plate passes the flipping mechanism 980, it goes to the buggy infeed belt 1010 where the plates are turned square to the buggy. The buggy infeed belt 1010 is between the scan conveyor 650 and the skate rollers 1050, and the buggy infeed belt 1010 optionally but preferably runs continuously. A gate 1020 with a prox sensor 1030 is mounted atop the center of the belt 1010. When the gate 1020 detects the presence of a plate, it stops the plate optionally but preferably for 0.5 second to allow the plate to be straightened and centered. An air cylinder then actuates the gate, which opens and allows a plate to pass to a staging area for distribution.

Atop the staging area are vertically facing skate rollers 1050. The skate rollers 1050 are positioned such that only plates positioned horizontally will pass to distribution; plates positioned lengthwise will fall through the center gap in the skate rollers 1050. Horizontally facing skate rollers 1060 are positioned above the vertically facing skate rollers 1050 to further guide the tie plates. The distribution staging area is designed to hold six tie plates. The computer has already scanned and counted the plates. Once the computer reads that there are six tie plates in the staging area, the computer hydrostatic drive system (creep drive) propels the truck forward. A release mechanism holds the next plate in place while the previous plate is advanced by a pneumatic cylinder. An encoder on the axel will tell the distance traveled, and every 19.5" of truck travel a plate will be released. The high shoulder of each plate goes to the outside of the rail.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention. Thus, the breadth and scope of the invention should not be limited by any of the above-described exemplary embodiments.

What is claimed is:

1. An apparatus for distributing tie plates alongside rails of a railroad track, comprising:
   a pre-load staging hopper and conveyor belt;

a singulating system for separating and singulating tie plates to be distributed along the rails of a railroad track, the singulating system comprising an infeed chute positioned beneath the pre-load staging hopper and conveyor belt for receiving the tie plates; an incline conveyor having a lower end and an upper end, wherein the lower end of the incline conveyor is positioned beneath the infeed chute; a bi-directional flat belt positioned at the upper end of the incline conveyor; a transfer chute positioned at a first end of the bi-directional flat belt for receiving a tie plate for orienting and distribution, and a conveyor belt at a second end of the bi-directional flat belt for recycling a tie plate back to the infeed chute;

an orientation system positioned beneath the transfer chute at the second end of the bi-directional flat belt, the orientation system comprising a scan conveyor belt, a scanner for detecting the orientation of a tie plate on the scan conveyor as the tie plate passes beneath the scanner, a processor in communication with the scanner for determining which direction a scanned tie plate needs to be rotated and whether the scanned tie plate needs to be flipped, and a flipping mechanism positioned at the end of the scan conveyor; and a distribution system for distributing tie plates along the rails of a railroad track, the distribution system comprising an infeed belt positioned adjacent the end of the scan conveyor and beneath the flipping mechanism; a gate between the scan conveyor and the infeed belt for aligning the tie plates as the tie plates move onto the infeed belt; a skate conveyor positioned adjacent the infeed belt; a lower belt feeder for aggregating tie plates to be distributed; and outfeed belts for depositing tie plates to the left or right of the rails of a railroad track.

2. An apparatus for distributing tie plates alongside rails of a railroad track, comprising:

a singulating system for separating and singulating tie plates to be distributed along the rails of a railroad track wherein the singulating system includes an infeed chute positioned beneath a pre-load staging hopper and conveyor belt for receiving the tie plates, an incline conveyor having a lower end and an upper end, wherein the lower end of the incline conveyor is positioned beneath the infeed chute, and a bi-directional flat belt positioned at the upper end of the incline conveyor;

an orientation system for orienting tie plates after the ties plates pass through the singulating system, wherein the orientation system is positioned beneath a transfer chute between the singulating system and the orientation system; and a distribution system for distributing the oriented tie plates exiting the orientation system along the rails of a railroad track, the distribution system comprising an outfeed assembly for depositing tie plates to the left or right of the rails of a railroad track.

3. The apparatus for distributing tie plates alongside rails of a railroad track of claim 2, wherein the singulating system further comprises a transfer chute positioned at a first end of the bi-directional flat belt for receiving a tie plate for orienting and distribution, and a conveyor belt at a second end of the bi-directional flat belt for recycling a tie plate back to the infeed chute.

4. The apparatus for distributing tie plates alongside rails of a railroad track of claim 2, wherein the distribution system further comprises an infeed belt positioned adjacent the end of the scan conveyor and beneath the flipping mechanism; a gate between the scan conveyor and the infeed belt for aligning the tie plates as the tie plates move onto the infeed belt; a skate conveyor positioned adjacent the infeed belt; and a lower belt feeder for aggregating tie plates to be distributed.

5. An apparatus for distributing tie plates alongside rails of a railroad track, comprising:

an infeed chute;

an incline conveyor sloping upward from a lower end to an upper end, wherein the lower end of the incline conveyor is positioned below the infeed chute;

a singulating conveyor receiving rail tie plates advanced upward and off of the incline conveyor, the singulating conveyor operable in combination with a singulating member to singulate tie plates and advance the singulated tie plates to a tie plate orienting system and to recycle tie plates not advanced to the tie plate orienting system to the incline conveyor;

the tie plate orienting system comprises a scan conveyor belt, a scanner for detecting the orientation of a tie plate on the scan conveyor as the tie plate passes beneath the scanner, and a processor in communication with the scanner for determining which direction a scanned tie plate is to be rotated.

6. The apparatus for distributing tie plates alongside rails of a railroad track of claim 5, wherein the orientation system further comprises a flipping mechanism positioned at the end of the scan conveyor.

7. A method of placing railroad tie plates alongside rails of a railroad track, the steps of the method comprising:

feeding railroad tie plates onto an incline conveyor of a tie plate distribution system;

conveying the tie plates up the incline conveyor and onto a singulating conveyor;

singulating the tie plates on a singulating conveyor and advancing singulated tie plates individually and in succession to a tie plate orientation system;

recycling tie plates not advanced to the tie plate orientation system from the singulating conveyor back to the incline conveyor;

orienting the singulated tie plates in a selected orientation in the tie plate orientation system after the ties plates pass through the singulating system; and distributing the oriented tie plates exiting the tie plate orientation system along the rails of a railroad track using a distribution system, the distribution system comprising an outfeed assembly for depositing the tie plates to the left or right of the rails of a railroad track.

\* \* \* \* \*